Figure 1:
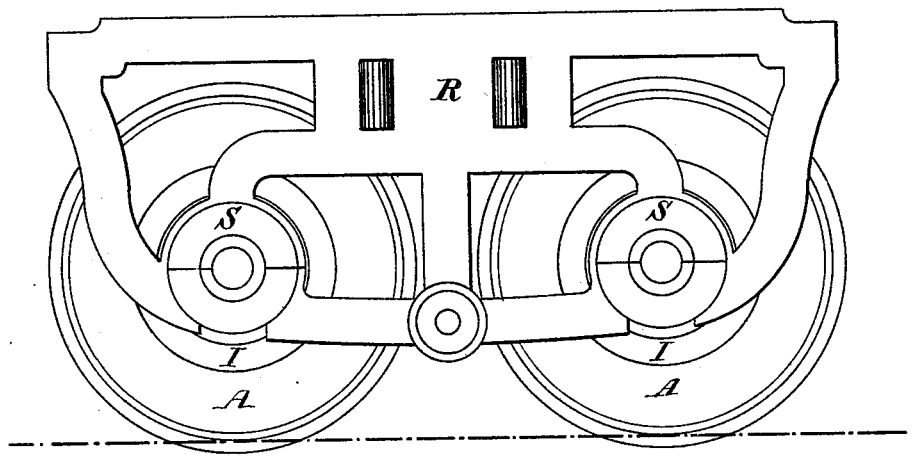

(No Model.)  
2 Sheets—Sheet 1.

J. FINDLAY.
Car Wheel.

No. 233,222. Patented Oct. 12, 1880.

Witnesses  
Louis Richard  
W. H. Barnett

Inventor  
John Findlay  
Per Charles G. Simpson  
Attorney

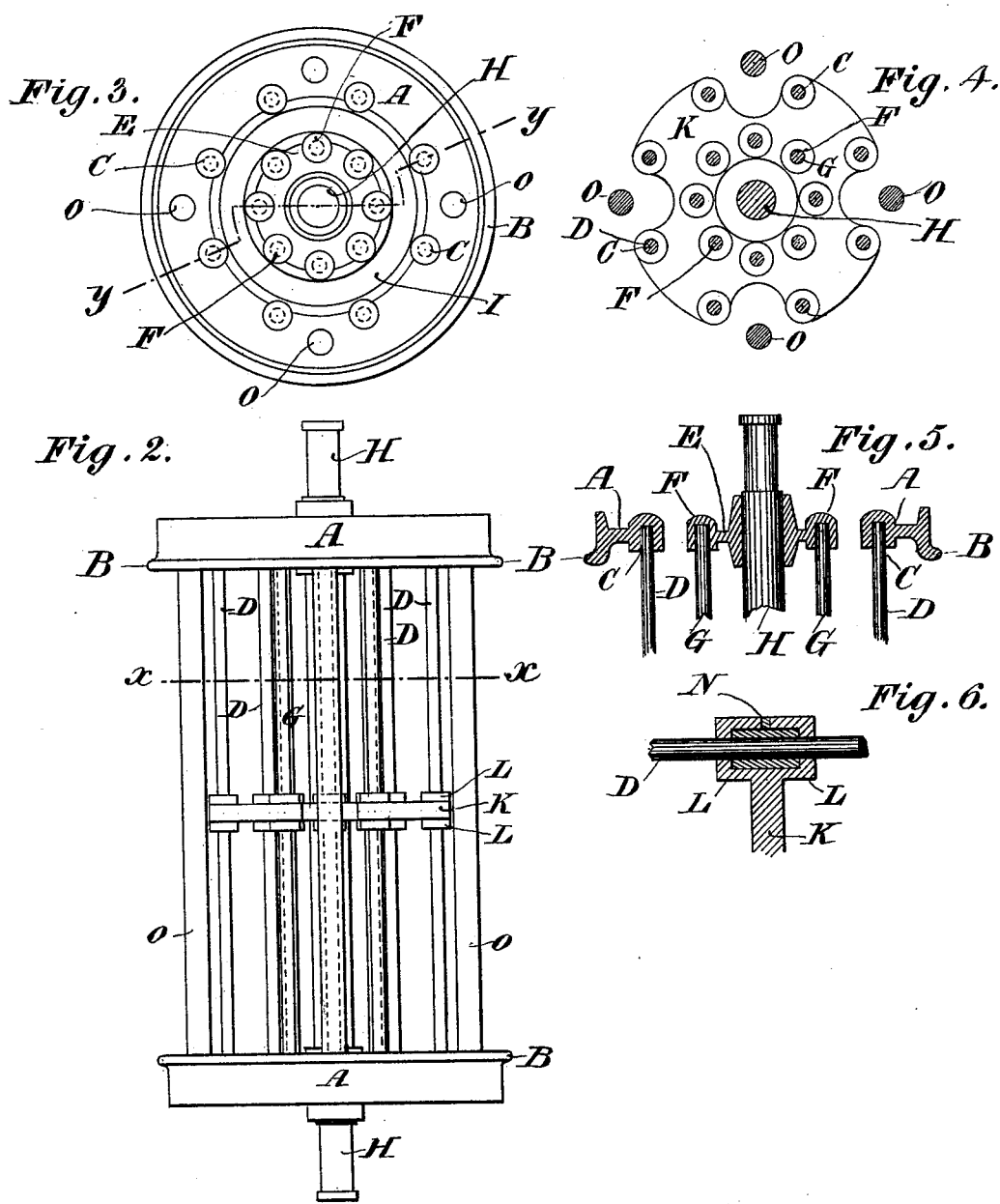

UNITED STATES PATENT OFFICE.

JOHN FINDLAY, OF MONTREAL, QUEBEC, CANADA.

CAR-WHEEL.

SPECIFICATION forming part of Letters Patent No. 233,222, dated October 12, 1880.

Application filed July 8, 1880. (No model.)

*To all whom it may concern:*

Be it known that I, JOHN FINDLAY, of the city and district of Montreal, Province of Quebec, Canada, iron-founder, have invented certain new and useful Improvements in Car Wheels and Springs; and I do hereby declare that the following is a full, clear, and exact description of the same.

This invention has reference to the construction of a wheel and axle for railway-cars, &c., so arranged that the wheel is only attached to the axle by means of springs, by which the shocks imparted to the wheel in traveling over the railway-track are received by the springs and deadened before they reach the axle, whereby the wear and tear of the journals and bearings of the axle is very much diminished. It also saves the periphery of the wheel from the dead heavy knocks it at present has to sustain.

This invention also allows of a much cheaper frame-work and parts of truck, so that no extra expense will, it is thought, be incurred by the extra expense of constructing this invention, when we take into consideration the cost of constructing the ordinary trucks of railway-cars with wheels and springs complete.

In this invention, as the periphery of the wheel is separate from what may be called the "hub" on the axle, and as the said periphery is so arranged that it will not require to be turned or otherwise cut with tools, (unless we take into consideration the ordinary dressings that castings receive when they first come out of the sand,) it may be made of hard cast-iron throughout, which will save the expense of chilling and annealing.

Besides the advantages above set forth, it also enables the wheels to spring equally in an oblique direction, instead of only straight up and down, as in those at present in use, whereby a much easier-riding and pleasanter spring is obtained.

In the drawings hereunto annexed similar letters of reference indicate like parts.

Figure 1 is a side elevation of a truck, showing the same in outline and the application of my invention thereto. Fig. 2 is a longitudinal elevation of my invention. Fig. 3 is an end elevation of Fig. 2. Fig. 4 is a section on line $x\,x$, Fig. 2, and showing plan of center plate. Fig. 5 is a section on line $y\,y$, Fig. 3, of wheel and hub, &c. Fig. 6 shows a method of securing springs to center plate.

A is the wheel, which consists of an annulet configurated (preferably) as shown in section in Fig. 5, forming the ordinary flange, B. It is also provided with a number of cylindrical recesses, C, for the reception of the end of the springs D, which in this case preferably consist of round bar-steel, as will be hereinafter more particularly explained.

E is the hub of the wheel, which is bored out and secured on the axle H in the ordinary manner. It is also provided with cylindrical recesses for the reception of springs G, similar to the springs D.

It will be observed that between the hub E and the annulets forming the peripherical part of the wheel A an annular space, I, is formed, the breadth of which must be equal to the amount that the springs D and G are to yield or deflect. These springs are secured in a plate, K, which plate is shown in elevation on edge in Fig. 2 and in plan in Fig. 4. At the points where the springs D and G pass through this plate projections are formed to give an extended bearing.

The securing of the springs in the plate may be done in any ordinary manner; but I prefer to do it in the manner indicated in Fig. 6, where the projections L are shown as formed with a hollow or chamber, M, and a small opening, N. The springs D and G are first put in place, being made as tight a fit as they can conveniently be got in with, after which composition of metal, such as Babbitt, &c., will be melted and the chambers M filled therewith.

Although but one center plate, K, is shown, and in most cases only one will be found necessary, yet, where greater stiffness of spring is required, two may be used, in which case the two plates will be placed at an equal distance longitudinally from the center.

O are distance or stay bolts or thimbles, placed between the wheels for securing them together and holding them at a proper distance apart. The ends of these may be riveted over after passing through the wheel, or they may be screwed and provided with nuts, or in any other desired manner, as long as they are made perfectly secure. Although eight springs, D, and eight, G, also four bolts, O, are shown, I do not wish to confine myself to the above numbers, as they may be increased or diminished without materially changing the invention in any way.

In constructing the invention I take plate K, and secure therein the springs D and G. I next secure on one end of the axle the hub E. I then take the axle and put it in place with the springs G entered into the recesses F at that end of the axle which has the hub E upon it; which having been accomplished, I then proceed to put on the other hub on the other end of the axle, care being taken to have the recesses F in it to agree with the other extremity of the springs G. I next take one of the annulets or wheels A, and, having secured in it the four stay bolts or thimbles O, I place it in position with the ends of the springs D entered into the recesses C in it. I next take the other wheel or annulet and place it upon the other ends of the bolts or thimbles O, and press or force it home to its place, when the ends of O are secured, as before stated.

In arranging the position of the openings in the wheels or annulets to receive O, care must be taken to have the recesses C in each of them fairly opposite. Otherwise, the ends of the springs will not agree with them, and to get the ends of the springs into place they will have to be bent, which I consider altogether objectionable, as it is likely to affect the action of the springs when put into use.

As shown in Fig. 1, each side of the truck consists of a simple plate, R, of the configuration shown, having journal-boxes S rigidly secured thereto, the two side plates, R, of the truck being attached together by any suitable upper cross frame-work of ordinary construction, and provided with any ordinary center for connecting with the king-bolt of the car. This figure is only given for the purpose of showing how the invention may be applied to the truck and the very simple form of truck required after the invention has been constructed. It is not my intention, however, at present, to make any claim for the construction of this truck, and therefore I do not consider it necessary to further describe it.

What I claim, and wish to secure by Letters Patent, is as follows:

1. The combination of the axle H, having springs G attached thereto, substantially as described, plate K, and annulets or wheels A, having springs D attached thereto, substantially as described.

2. The combination of the axle H, hubs E, having recesses F, springs G, plate K, and annulets or wheels A, having recesses C, substantially as and for the purposes set forth.

3. The combination of the wheel A with the hub E, having a perfectly empty annular space, I, between them, and with springs D and G, substantially as set forth.

JOHN FINDLAY.

Witnesses:
  H. IRWIN,
  CHARLES G. C. SIMPSON.